Dec. 18, 1962 J. FEINSTEIN 3,069,594

ELECTRON DISCHARGE DEVICES

Filed Nov. 27, 1959 2 Sheets-Sheet 1

INVENTOR
J. FEINSTEIN
BY David P. Kelley
ATTORNEY

Dec. 18, 1962 J. FEINSTEIN 3,069,594

ELECTRON DISCHARGE DEVICES

Filed Nov. 27, 1959 2 Sheets-Sheet 2

INVENTOR
J. FEINSTEIN
BY David P. Kelley
ATTORNEY 3,069,594

ELECTRON DISCHARGE DEVICES

Joseph Feinstein, Livingston, N.J., assignor to Bell Telephone Laboratories, Incorporated, New York, N.Y., a corporation of New York Filed Nov. 27, 1959, Ser. No. 855,933
23 Claims. (Cl. 315—39.3)

This invention relates to electron discharge devices, and more particularly, to such devices of the crossed-field, continuous-cathode magnetron amplifier type.

In general, magnetrons of this type make excellent oscillators; however, when attempts have been made heretofore to modify the magnetron oscillator in a manner whereby it would operate satisfactorily and efficiently as an amplifier, the results have, in general, proven very discouraging, the main disadvantage encountered being the very low gain obtained. Attempts to increase the gain of such an amplifier, utilizing priorly known techniques, such as increasing the length of the interaction circuit or increasing the anode voltage, have resulted in instability. One basic reason for the inherently low gain of prior magnetron amplifiers resides in the fact that the power increases linearly with distance along the circuit whereas, in beam-type velocity modulation devices, the power increases exponentially with distance along the circuit. For this reason, attention has heretofore been focused primarily on beam injected tubes of either the collinear or crossed-field types for amplification.

In the beam injected tubes of the traveling wave and klystron types, for example, the salient parameter involved in the determination of optimum gain is the ratio of radio-frequency circuit impedance to direct-current beam impedance. Of course, in the case of a crossed-field, continuous-cathode magnetron amplifier a replacement is required for the concept of direct-current beam impedance because there is no beam as such. Heretofore, there has been no appreciation of a satisfactory parameter in magnetron amplifiers to take the place of direct-current beam impedance, which, if minimized, maximized, stabilized or altered in some other way, would directly effect an increase in the otherwise inherently low gain realized with such devices, while at the same time affording satisfactory stability and efficiency.

In addition, a disadvantage priorly experienced with magnetron amplifiers of the continuous-cathode, re-entrant type, is that the re-entrant stream of electrons has never been satisfactorily debunched or stripped of phase information before entering the input section of the interaction region a second or subsequent time. A bunched re-entrant stream of electrons acts effectively as a feedback circuit creating additional instability problems. Such feedback has been minimized heretofore by keeping the number of resonators below a critical value which assures that the total phase shift around the circuit effected by a change in frequency over the operating band will be less than 180 degrees. This expedient disadvantageously results in a reduction in the number of otherwise usable cavity resonators and, hence, reduces the effective length of the interaction circuit, which, in turn, reduces the gain as well as the bandwidth of the device.

Accordingly, it is a general object of this invention to increase the gain in amplifiers of the crossed-field, continuous-cathode type.

It is another object of this invention to prevent feedback-instability problems, without appreciably affecting either the gain or bandwidth characteristics of such devices.

These and other objects of this invention are attained in one illustrative embodiment thereof wherein a magnetron amplifier of the crossed-field, continuous-cathode type comprises an inner resonant system surrounded by and coupled to an outer wave guide structure utilized to propagate the electromagnetic wave energy to be amplified. This wave guide is preferably of either the rectangular or ridge type. The inner resonant system comprises a plurality of anode cavity resonators defined by a plurality of anode vanes extending radially inwardly from a cylindrical anode. Coupling is effected between the inner resonant system and the outer wave guide by a plurality of slots extending through the circular anode at the closed ends of preferably each of the anode resonators. As thus far described, the magnetron amplifier, in accoradnce with the principles of this invention, is basically quite similar to the coaxial magnetron amplifier disclosed in United States Patent 2,926,285, issued February 23, 1960, of J. W. Gewartowski.

It is well known in the art, through various mathematical analyses, that, as a result of selective removal of electrons from the interaction space in a magnetron, the remaining electrons are bunched in such a manner that the resultant electron cloud resembles a spoked wheel which rotates in synchronism with the radio-frequency gap field. This rotating electron cloud will be referred to hereinafter as space-charge spokes or, simply, spokes. Amplification or generation of oscillatory energy in such devices is dependent upon the condition that electrons within the space-charge spokes have an angular velocity about the cathode which is in synchronism with that of the effective rotating radio-frequency field about the anode.

What is of particular interest in a magnetron amplifier is the maximum value of anode voltage, hereinafter referred to as the percentage direct-current voltage above synchronism, i.e., above the so-called Hartree voltage, that could be utilized so as to effect the realization of optimum gain. The reason why the value of anode voltage is so important resides in the fact that the direct current drawn in a magnetron depends mainly on the percentage direct-current voltage above synchronism and only slightly on the radio-frequency field strength. This is not to say, however, that the radio-frequency field strength is inconsequential in determining the amount of current drawn in a magnetron. Rather, while an increasing radio-frequency field in a magnetron amplifier, in contrast to the direct-current voltage above synchronism, has little direct effect on the direct-current drawn, it has a very serious effect on the upper limit of the direct-current voltage above synchronism that may be utilized before a limit of spoke-stability is reached, particularly along the input region of the device. The limit of spoke-stability may be defined as the point beyond which a further increase in direct-current voltage above the Hartree or synchronous value results in a loss of synchronism between the rotating spokes and the propagating wave. This has the effect of bending a portion of the spokes back toward the cathode with a consequent reduction in spoke current and, therefore, of generated power.

In other words, in crossed-field, continuous-cathode magnetron amplifiers heretofore, I have discovered that gain has suffered primarily because of the fact that the desired percentage of direct-current anode voltage above synchronism could not be optimized with respect to the increasing radio-frequency gap voltage continuously from the input to the output of the device. Alternatively stated, and as will become more apparent hereinafter, prior magnetron amplifiers of conventional design have not exhibited the desired relationship between the phase velocity of the propagating wave along the circuit and the angular velocity of the rotating electron spokes such that the device would exhibit an increase in power at a rate greater than as a linear function of distance along the circuit.

In accordance with an aspect of this invention, an optimum value of percentage direct-current anode voltage above synchronism with respect to the increasing radio-frequency gap voltage, as well as an optimum relationship between the rotating spokes and the propagating wave, is realized by maintaining what will hereinafter be referred to as the spoke-stability factor S substantially constant from the input to the output of the device. This spoke-stability factor S, which normally varies along the circuit in magnetron amplifiers of conventional design, in effect, takes the place of the beam impedance in beam-type modulation devices, and may be defined by the relation:

$$S=\frac{g_0}{f}$$

where $g_0$ is the desired percentage of direct-current voltage above synchronism, i.e., above the Hartree voltage, and $f$ is the ratio of radio-frequency electric field $E_{r-f}$ (taken at the so-called hub surface adjacent the cathode), to the direct-current synchronous electric field $E_0$. As will be shown hereinafter, $g_0$ is also equal to the ratio $$\frac{v_d-v_p}{v_p}$$

where $v_d$ is the electron drift velocity and $v_p$ is the phase velocity of the propagating wave.

The spoke-stability factor S, in accordance with the principles of this invention, advantageously may be maintained substantially constant along the circuit by making the phase shift per section an increasing function of distance and/or the direct-current electric field an increasing function of distance along the circuit. The phase shift per section may be altered, as embodied herein, by varying the frequency of successive resonators in a decreasing manner or by varying the length of the coupling slots in successive resonators in an appropriately increasing manner from the input to the output of the device. The desired increasing direct-current electric field is most readily accomplished by varying the cathode-anode spacing in a linearly decreasing manner from the input to the output of the device. Such a spacing is most easily effected by utilizing an off-centered cylindrical cathode for circuits with an arc length less than 180 degrees, or for longer circuits, a spiral-shaped cathode surface.

As will also be discussed in greater detail hereinafter, a magnetron amplifier embodying the salient principles of this invention will result in an approximate quadratic increase in power with distance along the circuit, whereas only an essentially linear increase in power with distance along the circuit has been possible heretofore with similar amplifiers of conventional design.

In accordance with still another aspect of this invention in certain embodiments thereof, the re-entrant current of a coaxial type of magnetron amplifier is substantially debunched by projecting the stream of electrons through a drift region having an arc length between one and one-half and three circuit wave lengths at the mid-band operating frequency in the drift region between and along the cathode and anode and by controlling the radial position and size of the re-entrant current which concomitantly permits operation with higher values of direct-current magnetic field, the reasons for which will become more apparent hereinafter. The optics of the re-entrant region for the electrons necessitate a departure from pure cylindrical surfaces priorly employed if the stream of electrons is to be effectively debunched and permit an increase in the magnetic field utilized. This is accomplished by modifying either the cathode or anode geometry, i.e., decreasing the cathode-anode spacing and positioning the re-entrant region radially with respect to the cathode such that the unbunched re-entrant current near the anode vanes at the input is augmented.

Accordingly, it is a principal feature of this invention that the otherwise variable spoke-stability factor S remains substantially constant from the input to the output of a continuous cathode, crossed-field amplifier.

It is a more specific feature of this invention in certain embodiments thereof that the otherwise variable spoke-stability factor S remains substantially constant by virtue of the phase shift per section being a uniformly increasing function of distance along the circuit. Specifically, in accordance with this feature of my invention in certain embodiments thereof, the phase shift per section is appropriately altered by progressively decreasing the frequency of successive resonators and/or increasing the lengths of the coupling slots associated therewith in a uniform manner from the input to the output of the device.

It is another feature of this invention in certain embodiments thereof that the spoke-stability factor S remains substantially constant by virtue of uniformly increasing the direct-current electric field intensity along the circuit. In accordance with this feature of my invention, in certain embodiments thereof, there is utilized an off-centered cylindrical cathode for circuits with an arc length less than 180 degrees, and, for longer circuits, a spiral-shaped cathode surface, both of which decrease the cathode-anode spacing along the circuit in an appropriate linear manner. In one embodiment of this invention both the phase shift per section and the direct-current electric field increase in the desired manner along the circuit.

It is an additional feature of this invention that the re-entrant current in a coaxial type of magnetron amplifier is substantially debunched by projecting the electrons through a drift region having an arc length between one and one-half and three circuit wave lengths at the mid-band operating frequency and altering the cathode-anode geometry such that the spacing therebetween at the re-entrant region is reduced slightly and positioned radially with respect to the cathode such that the electrons emerging therefrom augment the current near the anode vanes.

A complete understanding of this invention and of these and other features thereof may be gained from a consideration of the following detailed description taken in conjunction with the accompanying drawing, in which.

Figure 1:
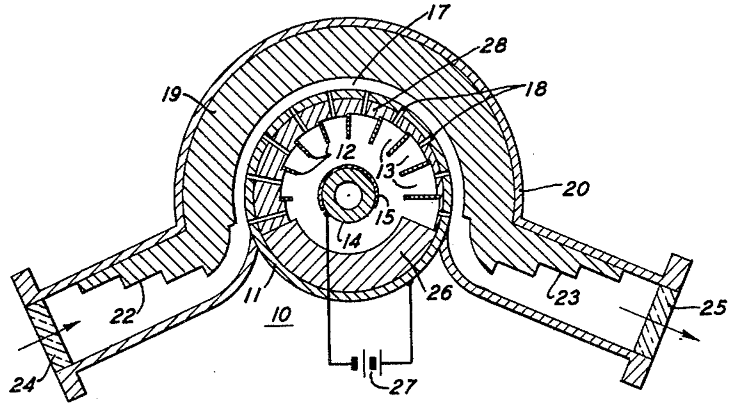
FIG. 1 is a sectional view of one illustrative embodiment of this invention comprising a coaxial type of magnetron amplifier.

Referring now more particularly to FIG. 1, there is depicted a coaxial magnetron amplifier 10 embodying the principles of this invention comprising a cylindrical anode 11 having a plurality of vanes 12 extending radially inwardly therefrom defining an array of anode cavity resonators 13. A cylindrical cathode 14 having an emissive surface 15 is positioned axially of the anode 11 and is utilized to provide electron emission in the amplification process. For thermionic emission, a filamentary-type of heater, not shown, would be positioned axially within the bore of the cathode 14. A wave guide 17 is coupled to the resonators 13 by coupling slots 18 through the cylindrical anode 11 at the rear or base of each resonator 13. The wave guide 17 in this specific illustrative embodiment is of the ridged type, including a ridge or fin member 19 extending from the outer arcuate wall 20 of the wave guide 17. Advantageously, the ridge or fin 19 has the same width as the resonator vanes 12. Circumferential wave propagation is therefore limited to the region defined between the ridge 19 and the cylindrical anode 11 and, thus, no discontinuity is introduced into the guide pattern by the coupling effected between the guide 17 and the resonators 13 through the coupling slots 18. The wave guide 17 is coupled through input and output transformer sections 22 and 23 wherein the ridge 19 is stepped to minimize reflection or distortion of the wave. Wave permeable windows 24 and 25 form a part of the vacuum envelope of the device, as is known in the art. A solid arcuate member 26 is secured to the inner surface of the cylindrical anode 11 along the region of the anode removed from the wave guide 17. Crossed electric and magnetic fields are utilized to confine the electrons along the desired trajectories between the cathode and anode. The radial electrostatic field between the cathode and anode structure is established by a potential difference therebetween, such as developed with the voltage source 27. Various types of well-known structure may be employed for producing the axial magnetic field, such structure not being shown for reasons of convenience and simplicity.

In accordance with an aspect of this invention, a wall member 28, of conductive material, is positioned adjacent the inner surface of the anode 11 and defines the depth of successive resonators 13 and, concomitantly, determines the resonant frequency and phase shift thereof. It is to be understood of course that the wall member 28 and the portion of the cylindrical anode 11 adjacent thereto could comprise one integral anode segment if desired. Since I have found that a substantially linearly increasing phase shift per section from the input to the output of the device will maintain the spoke-stability factor S substantially constant, the wall member 28 is decreased in thickness in an appropriate saw-tooth fashion between successive vanes 12 along the circuit, the actual variation in thickness being exaggerated in the drawing for purposes of illustration. As will be explained hereinafter, the approximately linearly increasing phase shift per section along the circuit resulting from the uniquely dimensioned resonators permits the relationship between the percentage direct-current voltage above synchronism $g_0$ and the radio-frequency electric field to be optimized continuously from the input to the output of the device. Both normal dispersion or forward wave operation and anomalous dispersion or backward wave operation are attainable. Generally, a propagating dominant mode rectangular or ridge-type of wave guide would be utilized for forward wave operation with coupling to each resonator, whereas a wave guide coupled to only every other resonator would be utilized for backward wave operation. As will be presently described in detail and verified theoretically, the structural arrangement, as embodied in FIG. 1, results in an increase in power which varies essentially as a quadratic function of distance along the circuit by reason of the substantially constant spoke-stability factor S rather than as a linear function of distance as realized with magnetron amplifiers of conventional design heretofore.

In the operation of the device of FIG. 1, which operation is equally applicable to the other embodiments described hereinafter, an electromagnetic wave is introduced into the coaxial magnetron 10 through the input of the wave guide section 17, as indicated by the arrow in FIG. 1. As is well known in the art, adjacent resonators are tightly coupled by the magnetic flux that links them and by the capacitance between the vanes 12. The individual resonators 13 preferably resonate in a fashion which resembles that of a quarter-wavelength section of parallel-wire line, the respective gaps between adjacent vanes corresponding to the open end of such a line and the back end of each resonator to the short-circuit end of such a line. This has the effect of providing a low impedance path for the flow of current, through the coupling slots 18 and into successive resonators with a consequent excitation of radio-frequency energy therein. Because of the infinite impedance that exists between adjacent anode vane tips 12, the excited radio-frequency electric field consequently has an antinode between adjacent vane tips resulting in the radio-frequency field extending into the cathode-anode space. However, it is to be understood of course that the principles of this invention and the advantages derived therefrom are not predicated on any one particular mode of operation of the device.

With the proper value of direct-current voltage above synchronism, $g_0$, utilized, in accordance with the principles of this invention, and with an appropriate value of axial magnetic field which serves to give the electrons the desired circular component of motion about the cathode, a cloud of electrons in the shape of a spoked wheel is caused to revolve around the axially positioned cathode. Net energy delivery to the resonators takes place if the direction of rotation of the electrons within each spoke is opposite to that of the rotating radio-frequency gap field, provided that the electrons within each spoke always pass the gap centers defined between successive vanes at the instants when the field is equal to or nearly equal to the maximum retarding field. Energy is thus transferred to the anode resonant system and, in turn, to the outer wave guide, as a result of the interaction of electrons with the radial direct electric field and the fringing radio-frequency gap field, the upper limit of which radio-frequency energy is dependent primarily upon the value of direct-current voltage above synchronism that may be utilized before instability sets in.

In order to understand better the principles of this invention with respect to the importance of maintaining the otherwise variable spoke-stability factor S substantially constant, and the effect thereof in increasing the gain of magnetron amplifiers of the crossed-field, continuous-cathode type, the following analysis may prove helpful:

Our attention will first be focused on certain of the characteristics of magnetron oscillators, which characteristics will afford a premise enabling a better understanding of the inventive concepts involved in magnetron amplifiers of the types embodied herein.

In a publication entitled, "Basic Magnetron Studies" (Wright Air Development Center), WADC Technical Report 56–529, July 1957, FIGS. 61 and 64 on pages 130 and 134, respectively, illustrate some significant spoke shapes for a magnetron oscillator. It is seen from these figures that all electron trajectories leaving the hub (the direct-current space-charge region adjacent the cathode surface) are able to reach the anode for values of the spoke-stability factor S, as defined herein, between 0 and 1. At $S=2$, on the other hand, portions of the respective spokes are turned back. Furthermore, along the critical electron trajectory which separates the spoke segments reaching the anode from the turned-back portions, the transit time approaches infinity giving rise to space-charge instability. Similar values of S have been found to exist for magnetron amplifiers. Thus, for a maximum value of S, hereinafter denoted $S_m$, which, for the case of a magnetron oscillator, lies between 1 and 2, a limit of spoke-stability exists in the sense that a further increase of direct-current voltage above synchronism, $g_0$, results in a reduction of spoke current and, therefore, of generated power.

I have found that the outstanding weakness of a conventional magnetron amplifier with respect to gain may be traced to the variation of the spoke-stability factor S, defined herein by the ratios $$\frac{g_0}{f} \text{ or } \frac{g_0}{E_{r-f}/E_{d-c}}$$

along the circuit. More specifically, the spoke-stability factor S will vary along the circuit of such devices with the least stable point generally occurring at the input, since the radio-frequency electric fields are weakest in this region. Thus, to insure stability at the input, it has been necessary to decrease $g_0$ at the input to a value well below the desired value which would have assured that the maximum number of electrons would be emitted from the cathode at a time favorable with respect to the rotating radio-frequency field so as to effect the greatest conversion of direct-current to radio-frequency energy during the amplification process.

I have discovered that an optimum design would be achieved if the spoke-stability factor S as defined herein were maintained constant continuously along the circuit. What is therefore sought is a variation of $g_0$ with respect to the increasing radio-frequency field $E_{r-f}$ such that the spoke-stability factor S will remain substantially constant from the input to the output of the circuit. In accordance with features of this invention, the optimum variation of $g_0$ may be effected by varying either the phase shift per section or the direct-current electric field in an appropriate manner from the input to the output of the device. The direct effect on $g_0$ and, concomitantly, on S, by varying the foregoing parameters, can be readily appreciated from a consideration of the following relationships defining $g_0$:

$$g_0 = \frac{v_d - v_p}{v_p} \qquad (1)$$

or $$g_0 = \frac{E_{d-c} - E_0}{E_0} \qquad (2)$$

where $E_{d-c}$ is the applied static electric field and $E_0$ is the lowest value of electric field below $E_{d-c}$ at which the electrons and the rotating radio-frequency electric field are in synchronism. In other words, from Equation 2 it is clearly seen that $g_0$ is the percentage direct-current voltage above the synchronous voltage $V_0$, since the electric fields in Equation 2 are directly related to the respective anode voltages which established them.

The specific effect on $g_0$ of varying the phase shift per section, so as to maintain the spoke-stability factor S substantially constant will now be considered.

The phase velocity $v_p$ in Equation 1 may be defined by the well-known expression $$v_p = \frac{\omega}{\beta} \qquad (3)$$

where $\omega$ is the angular frequency of operation for the device and $\beta$ is the phase shift per unit section along the circuit as defined herein.

It is thus seen from Equation 3 that if the phase shift per section $\beta$ is increased along the circuit, the phase velocity $v_p$ decreases resulting in the percentage voltage above synchronism $g_0$ increasing as seen from Equation 1. The question then arises, how may $\beta$ be increased by varying the resonant frequency of successive resonators such as in the device depicted in FIG. 1? The answer to this question can be easily resolved from an examination of an $\omega$ versus $\beta$ graph such as illustrated in FIG. 2.

Figure 2:
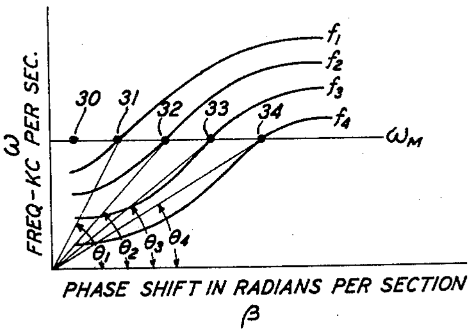
FIG. 2 is a graphical representation of dispersion curves for a succession of resonators of different resonant frequencies which facilitates an explanation of the principles of this invention.

The dispersion curves in the graph of FIG. 2 represent generally four successive resonators each having a different resonant frequency designated, respectively, as $f_1$ through $f_4$ for use in a device such as of FIG. 1. The horizontal line 30 represents the mid-band frequency $\omega_m$ as defined in Equation 3 of the device for purposes of illustration. The intersecting points 31 through 34 represent, respectively, the operating conditions for each of the four resonators. As is well-known in the art, the angle $\theta$ between the abscissa and a line drawn from the origin of an $\omega$ versus $\beta$ curve to an operating point, such as the point designated 31, for example, determines the relative magnitude of the phase velocity $v_p$ of a wave in traversing past that region of the circuit, the value of $v_p$ increasing directly with the angle $\theta$. as seen from Equation 1, it is desired that the value of $v_p$ be largest at the input and smallest at the output since it is desired that $g_0$ increase in proportion to the radio-frequency electric field along this circuit to the output such that the spoke-stability factor S remains substantially constant. Accordingly, from the graph of FIG. 2 it is seen that the resonant frequency of successive resonators should decrease from the input to the output as this has the desired effect of increasing the phase shift per section $\beta$ along the circuit which, as seen from Equation 3, verifies that $v_p$ decreases and as seen from Equation 1, verifies that $g_0$ increases in accordance with the principles of this invention.

From the above analysis and by reason of the definition of $g_0$, it becomes readily apparent that a parameter other than the phase shift parameter $\beta$ may be varied in a manner whereby the spoke-stability factor S will remain substantially constant along the circuit. More specifically, the static electric field $E_{d-c}$ in Equation 2 may be defined by the well-known relationship $$E_{d-c} \cong \frac{V_{d-c}}{d} \qquad (4)$$

where $V_{d-c}$ is the anode voltage and $d$ is the cathode-anode spacing, an exact relationship being altered to a slight extent by the presence of the space charge within the hub adjacent the cathode. It is thus seen that by making the cathode-anode spacing a linearly decreasing function of distance along the circuit, the parameter $E_{d-c}$ is increased which in turn results in $g_0$ increasing as evidenced from Equation 2. Therefore, when $g_0$ increases in proportion to the radio-frequency field in accordance with the principles of this invention, such that the relation $$S = \frac{g_0}{f} = \frac{g_0}{E_{r-f}/E_{d-c}}$$

remains substantially constant along the circuit, optimum gain defined by Equation 4 will be realized.

What is now of particular interest is the approximate magnitude of the increase in gain that can be expected from a magnetron amplifier embodying the principles of this invention. Complex analyses could be undertaken to derive the final expressions for the gain in both the conventional types of magnetron amplifiers and the types disclosed herein. It is believed, however, that in the interest of simplicity as well as clarity, a final expression for the gain of the instant embodiments will prove both sufficient and most beneficial inasmuch as this expression includes the coefficients that likewise define the gain of a conventional magnetron amplifier. Since the point of greatest variation of the spoke-stability factor S is generally at the input of a magnetron amplifier by reason of the weak radio-frequency fields, as noted above, the spoke-stability factor S should be maximized in this region and maintained constant thereafter along the circuit. It can then be shown that the power output P(L) for a circuit characterized by a constant and maximized spoke-stability factor $S_m$ and of length L is defined by the expression:

$$P(L) = \left[\frac{CS_mL}{2} + \sqrt{P_i}\right]^2 = P_i + CS_mL\sqrt{P_i} + \left[\frac{CS_mL}{2}\right]^2 \qquad (5)$$

where C contains the electronic efficiency and the system dimensions, together with the value of the magnetic field B employed and $P_i$ is the radio-frequency input power.

In a conventional magnetron amplifier it can be shown that the power output is also defined by Equation 5 less the third term $$\left[\frac{CS_mL}{2}\right]^2$$

Accordingly, by way of example, for the case where the generated radio-frequency output power is 10 times the input power $$CS_mL=10\sqrt{P_i} \quad (6)$$

so that the extra term in Equation 5, obtained in accordance with principles of this invention, is $$\left[\frac{CS_mL}{2}\right]^2=25P_i \quad (7)$$

Thus, it is seen that for the optimized circuit $P(L)=36P_i$, as compared with $P(L)=11P_i$ for the conventional constant $\beta$ and constant $E_{d-c}$ type of magnetron amplifier exhibiting a variable spoke-stability factor S. Accordingly, power in a crossed-field, continuous-cathode magnetron amplifier, in accordance with the principles of this invention, increases substantially as a quadratic function of distance along the circuit rather than as a linear function as previously experienced.

I have found that a phase velocity variation along the circuit in the range between 50 and 100 percent from the input to the output, preferably in a substantially uniformly increasing manner, is called for in order to effect optimum gain in accordance with Equation 5. A linear decrease in the cathode-anode spacing from the input to the output of the same order is called for in accordance with the principles of this invention to offer optimum gain.

Advantageously, with the phase velocity made higher at the input end of the circuit, then, at a direct-current voltage operating point which corresponds to a fairly high $g_0$ at the output end of the circuit, a low $g_0$ exists at the input end of the circuit. Since the higher phase velocity is accompanied by a slower rate of decay of radio-frequency field toward the hub, a further strengthening of spoke stability at the input end of the circuit results.

Having analyzed the inventive concepts as embodied and claimed herein which makes a substantially quadratic increase in power with distance along the circuit possible, our attention will now be directed to the remaining novel arrangements which effect amplification in accordance with the principles of this invention.

Figure 3:
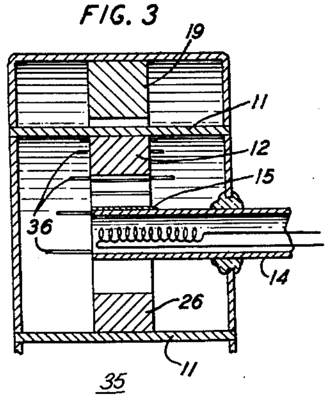
FIG. 3 is a partial sectional view of another magnetron amplifier embodying the principles of this invention.

FIG. 3 depicts in partial section an amplifier 35 embodying the principles of this invention which is quite similar to the device of FIG. 1 in terms of both structure and function. The device of FIG. 3 can be considered basically as a sectional view through the axis of the device of FIG. 1 absent the wall member 28 of variable thickness. For convenience, the structural elements in the device of FIG. 3 which correspond to those appearing in the amplifier of FIG. 1 are designated by like reference numerals. In accordance with an aspect of this invention, the phase shift per section along the interaction circuit from the input to the output of the device is increased in approximately uniform increments by the expediency of varying the length of the coupling slots 36 in an increasing manner in successive resonators 13 rather than by varying the physical dimensions of successive resonators with the variable wall member 28 utilized in the device of FIG. 1. Varying the length of the coupling slots 36 has the effect of shifting the operating point of successive resonators in the desired manner as illustrated on the $\omega$ versus $\beta$ graph of FIG. 2. This expedient also has the advantage of facilitating the manufacture of the device as compared to the necessity of actually changing the physical dimensions of the resonators in the device of FIG. 1. Of course, it is to be understood that the novel expedients utilized in the device of FIG. 1 for maintaining the spoke-stability factor S substantially constant could be utilized in combination, as well as in combination with the novel structural expedients incorporated in the embodiments of FIGS. 4 through 7 presently to be described.

Figure 4:
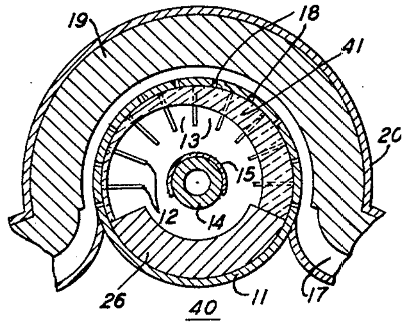
FIG. 4 is a partial sectional view taken immediately adjacent one side of the anode vanes of another magnetron amplifier embodying the principles of this invention.

FIG. 4 depicts in partial section an amplifier 40 embodying the principles of this invention. For convenience, certain of the elements which correspond to those appearing in FIGS. 1 and 3 will be identified by the same reference numerals. In device 40 the resonant frequency of successive resonators is decreased along the circuit by loading the resonators with a slab of ceramic 41, such as of aluminum oxide, for example, positioned adjacent one side of the anode resonators. As is known in the art, the greater the surface area of such a ceramic adjacent a resonant region, the lower will be the effective resonant frequency of the region. As seen from the above-described analysis, it is desired that the resonant frequency of successive resonators decreases from the input to the output which has the effect of increasing the phase shift per section such that the spoke-stability factor S remains substantially constant along the circuit. Accordingly, the slab of ceramic 41 is tapered in width from a minimum at the input to a maximum at the output of the resonant circuit whereby the resonant frequency of successive resonators decreases along the circuit in a manner similar to the frequency variation realized with the devices of FIGS. 1 and 3.

It is to be understood of course that the expedients for varying the phase per section as embodied herein are only illustrative and in no way intended to be exhaustive. For example, by positioning a tapered dielectric member within the outer wave guide immediately adjacent the cylindrical anode and coupling slots, the desired variation in the phase shift per section could similarly be effected such that the spoke-stability factor S would remain substantially constant along the circuit. The phase shift per section could also be varied in the desired increasing manner by progressively changing the path length in the guide per period, i.e., the path length in the guide between adjacent coupling slots in succession. Such a variation in the path length could be effected by utilizing serpentine wave guide similar to that disclosed in copending application Serial No. 738,893, filed May 29, 1958, now U.S. Patent No. 2,988,669, of R. J. Collier and J. Feinstein.

Figure 5:
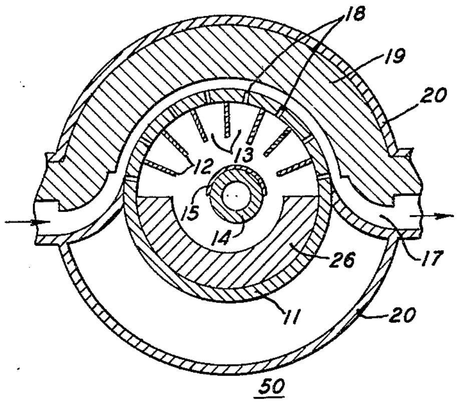
FIG. 5 is a partial sectional view of still another illustrative embodiment in accordance with the principles of this invention.

FIG. 5 depicts in partial section another magnetron amplifier 50 embodying the principles of this invention, the elements of which correspond to those appearing in FIG. 1, being identified by like reference numerals. In accordance with another aspect of this invention, the direct-current electric field increases as a linear function of distance along the circuit by positioning the cylindrical cathode 14 off-center with respect to the axis of the cylindrical anode 11 such that the cathode-anode spacing varies as a linearly decreasing function of distance from the input to the output of the device. Advantageously, when the arc length of the interaction region is less than 180 degrees, such an arrangement permits the otherwise variable spoke-stability factor S to remain substantially constant along the interaction region of the device, as verified from the above-described analysis. This linearly decreasing cathode-anode spacing has the effect of permitting the percentage direct-current voltage above synchronism $g_0$, to be varied in an optimum manner with respect to the increasing radio-frequency electric field continuously from the input to the output of the device. Accordingly, the power in a magnetron amplifier of the type embodied in FIG. 5 likewise varies essentially as a quadratic function of distance along the circuit rather than as a linear function of distance as realized with magnetron amplifiers of conventional design heretofore. The only other basic structural modification in this device as compared with the device of FIG. 1, is that the cylindrical outer wave guide member 20 completely surrounds the anode structure and thus forms the main part of the tube envelope. In all other respects, the device of FIG. 5 is essentially the same as the device of FIG. 1 and operates in a similar manner.

Figure 6:
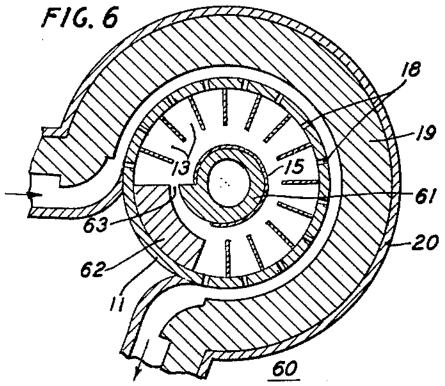
FIG. 6 is a partial sectional view of an additional magnetron amplifier embodying the principles of this invention.

FIG. 6 depicts in partial section still another magnetron amplifier 60 embodying the principles of this invention wherein the interaction circuit may advantageously be longer than the maximum arc length of 180 degrees permitted in the device of FIG. 5. Structural elements in FIG. 6 which are similar to those appearing in FIG. 1 are likewise identified by corresponding reference numerals. The cathode 61 in the device of FIG. 6 has a spiral-shaped outer surface with an emissive coating 15 applied thereto. This unique cathode configuration permits the cathode-anode spacing to be varied in a linearly decreasing manner from the input to the output of the device, which could actually encompass an arc length of almost 360 degrees, if desired, such that the spoke-stability factor S will remain substantially constant with distance along the circuit.

In accordance with another aspect of this invention, a solid arcuate member 62, which preferably should be contiguous with the anode for an arc length between one and one half and three wave lengths at the mid-band operating frequency, together with the outer surface of cathode 14 adjacent thereto forms a drift space wherein the beam is effectively debunched before traversing the re-entrant region 63. By modifying the cathode-anode geometry of the re-entrant region 63 such that the re-entrant stream of electrons is slightly reduced in cross section and channeled into the interaction region at the input of the device in close proximity to the tips of the anode vanes 12, a two-fold benefit is achieved. Firstly, the current near the anode vanes along the input region of the circuit is augmented, which advantageously permits the utilization of a higher value of axial magnetic field which, indirectly, in combination with a corresponding higher value of electric field, effects an additional increase in the gain that is realizable in a magnetron amplifier.

Secondly, the modified re-entrancy, wherein the cross-sectional space between the arcuate member 62 and the cathode surface adjacent thereto is reduced by a slight amount, approximately 25 percent, for example, has the effect of enhancing the debunching of the electrons traversing the drift region to an extent whereby no phase information or feedback problems are presented during operation of the device. Such a modified re-entrancy region in combination with the short drift section employed results in a demodulation of the re-entrant electrons to an extent that alleviates the necessity of any prior expedients for minimizing feedback instability in such devices. More specifically, with a drift tube section and a modified re-entrancy region as embodied in FIG. 6, there is no dependency on or necessity in having the total phase shift around the circuit, effected by a change in frequency over the operating band, to be less than 180 degrees as required for satisfactory and stable amplification in magnetron amplifiers of conventional design. Such a total phase shift limitation as priorly required quite obviously reduces the otherwise usable length of interaction circuit, as well as seriously limits the bandwidth characteristics of the circuit. Inasmuch as the device of FIG. 6 in all other respects is basically the same as the device of FIG. 5 and operates in the same manner as the device of FIG. 1, further description in that regard is not believed necessary.

Figure 7:
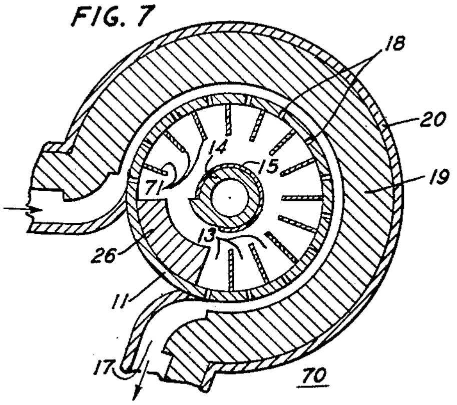
FIG. 7 is a partial sectional view of still another magnetron amplifier embodying principles of this invention in combination.

FIG. 7 depicts in partial section another magnetron amplifier 70 embodying the principles of this invention. As in the previous embodiments, certain of the elements that correspond to those previously described will be identified by the same reference numerals for convenience. In accordance with aspects of this invention in combination, the phase shift per section and the direct-current electric field are made to increase simultaneously along the circuit from the input to the output of device 70 in the desired manner so as to maintain the spoke-stability factor S substantially constant. The phase shift per section is varied in the appropriate increasing manner along the circuit by changing the length of successive anode vanes 71 from a minimum at the input to a maximum at the output. This has the effect of decreasing the resonant frequency of successive resonators in the same way as is accomplished with the metallic wall member 28 of variable thickness in the device of FIG. 1. In addition to the phase shift per section variation, however, the uniformly increasing length of the anode vanes 71 in the device 70 concomitantly decreases the cathode-anode spacing even though the cathode 14 is positioned axially of the cylindrical anode 11 and, thus, the direct-current electric field increases in intensity along the circuit in the same manner as is effected with the off-centered or spiral cathodes utilized in the devices of FIGS. 5 and 6. It is thus seen that the device 70 maintains the spoke-stability factor S substantially constant along the circuit by varying both the phase shift per section and the direct-current electric field simultaneously in a substantially uniformly increasing manner from the input to the output of the device. In all other respects, amplifier 70 is similar to the previously described embodiments.

It is to be understood that the specific embodiments described herein are merely illustrative of the general principles of this invention. For example, while attention has been focused primarily on magnetron amplifiers of the coaxial type with a re-entrant region, it is to be understood that the principles of this invention are equally applicable to crossed-field, continuous-cathode amplifiers of the linear type. The main advantage of the coaxial type of magnetron amplifier resides in the fact that the re-entrant stream of electrons enhances the optimum efficiency that may be realized with such devices. Similarly, the interaction circuit does not have to be of the resonant cavity type as disclosed herein. Rather, any slow wave interaction circuit, such as periodically loaded circuits of the ladder or interdigital types can similarly be utilized in accordance with the principles of this invention. In such circuits the phase shift per section can be readily increased in the desired manner by progressively decreasing the spacing between adjacent elements forming the slow wave periodic array. The electric field can be altered in such circuits in the same manner as in the illustrative embodiments. Various other structural arrangements and modifications may also be derived in the light of this disclosure by those skilled in the art without departing from the spirit and scope of this invention.

What is claimed is:

1. An electron discharge device comprising an array of spaced elements forming an interaction circuit, continuous-cathode means positioned adjacent said interaction circuit, wave guide means including input and output signal means adjacent the respective ends of said interaction circuit, said device being characterized by having a spoke-stability factor S from said input to said output defined by the expression $$S=\frac{g_0}{f}$$

where $g_0$ equals the ratio of the drift velocity minus the phase velocity to the phase velocity and $f$ is the ratio of radio-frequency to direct-current electric field near the cathode surface, and means for maintaining said spoke-stability factor S substantially constant from said input to said output, said last-mentioned means comprising means for introducing a substantially linearly varying asymmetry in at least one of said cathode and interaction circuit from said input to said output signal means.

2. An electron discharge device in accordance with claim 1 wherein said interaction circuit comprises means defining an array of cavity resonators each having a closed end.

3. An electron discharge device comprising means defining a wave interaction circuit, continuous-cathode means positioned adjacent said interaction circuit, wave guide means including input and output signal means adjacent the respective ends of said interaction circuit, said device being characterized by having a spoke-stability factor S from said input to said output defined by the expression $$S=\frac{g_0}{f}$$

where $g_0$ equals the ratio of the drift velocity minus the phase velocity to the phase velocity and $f$ is the ratio of radio-frequency to direct-current electric field near the cathode surface, means for maintaining said spoke-stability factor S substantially constant, said last-mentioned means comprising means for imparting a predetermined variation to one of said parameters defining said spoke-stability factor S to compensate for the variation in the other of said parameters defining S from the input to the output of said device.

4. An electron discharge device in accordance with claim 3 wherein said wave interaction circuit comprises an array of anode cavity resonators and wherein said means for imparting a predetermined variation to one of said parameters defining said spoke-stability factor S comprises a substantially linearly decreasing spacing between said cathode and said anode resonators from said input to said output.

5. An electron discharge device in accordance with claim 3 wherein said wave interaction circuit comprises an array of anode vane-type cavity resonators and wherein said means for imparting a predetermined variation to one of said parameters defining said spoke-stability factor S comprises increasing the length of successive vanes defining said cavity resonators in substantially uniform decrements from said input to said output such that the resonant frequency of successive resonators decreases and the phase shift per section increases from said input to said output.

6. An electron discharge device in accordance with claim 3 wherein said wave interaction circuit comprises an array of cavity resonators and wherein said means for imparting a predetermined variation to one of said parameters defining said spoke-stability factor S comprises a member of dielectric material positioned adjacent one side of said array of cavity resonators with the surface area of said dielectric material adjacent said resonators decreasing from a maximum at the input to a minimum at the output in a substantially linear manner such that the resonant frequency of successive resonators is decreased and the phase shift per section increased along the circuit from the input to the output of the device.

7. An electron discharge device in accordance with claim 3 wherein said means for imparting a predetermined variation to one of said parameters defining said spoke-stability factor S comprises substantially uniformly increasing the phase velocity characteristic along said circuit from said input to said output of said device.

8. A magnetron amplifier comprising means defining an array of cavity resonators each having a closed end, continuous-cathode means positioned adjacent said array of cavity resonators, wave guide means including input and output signal means adjacent the closed ends of said cavity resonators and coupled thereto, said magnetron amplifier being characterized by having a spoke-stability factor S from said input to said output defined by the expression $$S=\frac{g_0}{f}$$

where $g_0$ equals the ratio of the drift velocity minus the phase velocity to the phase velocity and $f$ is the ratio of radio-frequency to direct-current electric field near the cathode surface, means for maintaining said spoke-stability factor S substantially constant, said last-mentioned means comprising means for imparting a predetermined variation to one of said parameters defining said spoke-stability factor S to compensate for the variation in the other of said parameters defining S from the input to the output of said amplifier.

9. A magnetron amplifier in accordance with claim 8 wherein said means for imparting a predetermined variation to one of said parameters defining said spoke-stability factor S comprises a substantially linearly decreasing spacing between said cathode and said anode resonators from said input to said output.

10. A magnetron amplifier in accordance with claim 8 wherein said means for imparting a predetermined variation to one of said parameters defining said spoke-stability factor S comprises an arcuate wall member defining the closed ends of said cavity resonators, the thickness of said wall member decreasing in equal decrements in successive resonators from said input to said output for varying the phase shift per section of successive resonators in a uniformly decreasing manner from said input to said output of said amplifier.

11. A magnetron amplifier in accordance with claim 8 wherein said cavity resonators are formed by anode vanes and wherein said means for imparting a predetermined variation to one of said parameters defining said spoke-stability factor S comprises increasing the length of successive vanes in substantially uniform decrements from said input to said output of said amplifier.

12. A magnetron amplifier in accordance with claim 8 wherein said means for imparting a predetermined variation to one of said parameters defining said spoke-stability factor S comprises a ceramic member positioned to one side of said array of cavity resonators for loading successive resonators from said input to said output in a substantially uniformly increasing manner.

13. A magnetron amplifier in accordance with claim 12 wherein the surface area of said ceramic member adjacent said array of cavity resonators increases from a minimum at the input to a maximum at the output of said amplifier.

14. A magnetron amplifier in accordance with claim 8 wherein said wave guide means is coupled to the closed ends of said cavity resonators through coupling slots in the closed ends of each of said cavity resonators and wherein said means for imparting a predetermined variation to one of said parameters defining said spoke-stability factor S comprises varying the length of said coupling slots as a substantially linear increasing function of distance from said input to said output of said amplifier.

15. A magnetron amplifier comprising means defining an array of cavity resonators each having a closed end, continuous-cathode means positioned adjacent said array of cavity resonators, wave guide means including input and output signal means adjacent the closed ends of said cavity resonators, means for coupling said wave guide means to said cavity resonators, said magnetron amplifier being characterized by having a spoke-stability factor S from said input to said output defined by the expression $$S=\frac{g_0}{f}$$

where $g_0$ equals the ratio of the drift velocity minus the phase velocity to the phase velocity and $f$ is the ratio of radio-frequency to direct-current electric field near the cathode surface, and means for maintaining said spoke-stability factor S substantially constant, said last-mentioned means comprising a wall member of variable thickness defining the closed ends of said resonators, said wall member progressively decreasing in thickness in successive resonators from said input to said output for varying the phase shift per section of successive resonators in a substantially uniform decreasing manner from said input to said output.

16. A magnetron amplifier in accordance with claim 15 wherein said means for coupling said wave guide to said cavity resonators comprises slots extending through said wall member defining the closed ends of said resonators and wherein said means for maintaining said spoke-stability factor S substantially constant further comprises varying the length of said coupling slots in successive resonators in a uniformly increasing manner from said input to said output of said amplifier.

17. A magnetron amplifier comprising means defining an array of cavity resonators each having a closed end, wave guide means including input and output signal means adjacent the closed ends of said cavity resonators, means for coupling each of said resonators to said wave guide means, said coupling means including slots extending through said closed ends of said resonators to said wave guide means, said magnetron amplifier being characterized by having a spoke-stability factor S from said input to said output, means for maintaining said spoke-stability factor S substantially constant, said means including means comprising a cylindrical cathode positioned adjacent said cavity resonators and off-set with respect to the axis of said array of cavity resonators such that the spacing between said cavity resonators and said cathode decreases as a linear function of distance from said input to said output, and means for biasing said cavity resonators positively with respect to said cathode for establishing an electrostatic field therebetween which increases in magnitude as a substantially linear function of distance from said input to said output of said amplifier.

18. A magnetron amplifier comprising means defining an array of cavity resonators each having a closed end, wave guide means including input and output signal means adjacent the closed ends of said cavity resonators, means for coupling each of said resonators to said wave guide means, said coupling means including slots extending through said closed ends of said resonators to said wave guide means, said magnetron amplifier being characterized by having a spoke-stability factor S from said input to said output, means for maintaining said spoke-stability factor S substantially constant, said means including means comprising a spiral-shaped cathode positioned adjacent said cavity resonators such that the space between said cavity resonators and said cathode surface from said input to said output varies as a substantially linear decreasing function of distance, and means for biasing said cavity resonators positively with respect to said cathode for establishing an electrostatic field therebetween which increases in magnitude as a substantially linear function of distance from said input to said output of said amplifier.

19. A magnetron amplifier comprising means defining an arcuate array of cavity resonators each having a closed end, cylindrical continuous-cathode means positioned adjacent said arcuate array of cavity resonators, wave guide means including input and output signal means adjacent the closed ends of said cavity resonators and coupled thereto, arcuate means between said output and input means and positioned adjacent said cathode means defining a drift region and a re-entrant region adjacent said input means, said magnetron amplifier being characterized by having a spoke-stability factor S from said input to said output defined by the expression $$S=\frac{g_0}{f}$$

where $g_0$ equals the ratio of the drift velocity minus the phase velocity to the phase velocity and $f$ is the ratio of radio-frequency to direct-current electric field near the cathode surface, and means for maintaining said spoke-stability factor S substantially constant, said last-mentioned means comprising means for imparting a predetermined variation to one of said parameters defining said spoke-stability factor S to compensate for the variation in the other of said parameters defining S from the input to the output of said amplifier.

20. A magnetron amplifier in accordance with claim 19 wherein said drift space comprises an arc length between one and one half and three wavelengths at said mid-band operating frequency, wherein the spacing between said cathode means and said arcuate means in said re-entrant region is slightly reduced from the spacing in said drift region and wherein said re-entrant region is positioned in closer proximity to said cavity resonators than said cathode means at said input means.

21. A magnetron amplifier in accordance with claim 19 wherein said means for imparting a predetermined variation to one of said parameters defining said spoke-stability factor S comprises a substantially linearly decreasing spacing between said cathode means and said anode resonators from said input to said output means.

22. A magnetron amplifier in accordance with claim 19 wherein said means for imparting a predetermined variation to one of said parameters defining said spoke-stability factor S comprises an arcuate wall member of variable thickness defining the closed ends of said cavity resonators, the thickness of said wall member decreasing in equal decrements in successive resonators from said input to said output means of said amplifier.

23. A magnetron amplifier in accordance with claim 19 wherein said wave guide means is coupled to the closed ends of said cavity resonators through coupling slots in the closed ends of each of said cavity resonators and wherein said means for imparting a predetermined variation to one of said parameters defining said spoke-stability factor S comprises varying the length of said coupling slots as a substantially linear increasing function of distance from said input to said output means.

References Cited in the file of this patent

UNITED STATES PATENTS

| | | |
|---|---|---|
| 2,715,697 | Webber | Aug. 16, 1955 |
| 2,808,538 | Cutler | Oct. 1, 1957 |
| 2,890,372 | Dench | June 9, 1959 |
| 2,926,285 | Gewartowski | Feb. 23, 1960 |
| 2,942,142 | Dench | June 21, 1960 |

FOREIGN PATENTS

| | | |
|---|---|---|
| 1,071,983 | France | Mar. 10, 1954 |
| 816,411 | Great Britain | July 15, 1959 |